(12) United States Patent
Asher et al.

(10) Patent No.: US 8,086,556 B2
(45) Date of Patent: Dec. 27, 2011

(54) GEOCODING METHOD USING MULTIDIMENSIONAL VECTOR SPACES

(75) Inventors: Michael Asher, Green Cove Springs, FL (US); Charles Giddens, Conyers, GA (US); Hossein Eslambolchi, Los Altos Hills, CA (US); Harold J. Stewart, Alpharetta, GA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 246 days.

(21) Appl. No.: 12/605,754

(22) Filed: Oct. 26, 2009

(65) Prior Publication Data

US 2010/0049765 A1 Feb. 25, 2010

Related U.S. Application Data

(63) Continuation of application No. 11/319,112, filed on Dec. 27, 2005, now abandoned.

(60) Provisional application No. 60/649,286, filed on Feb. 2, 2005.

(51) Int. Cl.
*G06F 9/44* (2006.01)
*G06N 7/02* (2006.01)

(52) U.S. Cl. .................. 706/52; 711/108; 365/5

(58) Field of Classification Search .................. 706/52
See application file for complete search history.

(56) References Cited

U.S. PATENT DOCUMENTS

| | | |
|---|---|---|
| 5,912,696 A | 6/1999 | Buehl |
| 6,101,496 A | 8/2000 | Esposito |
| 6,247,019 B1 | 6/2001 | Davies |
| 6,498,982 B2 | 12/2002 | Bellesfield et al. |
| 2003/0009239 A1* | 1/2003 | Lombardo et al. .............. 700/30 |

* cited by examiner

*Primary Examiner* — Omar Fernandez Rivas
*Assistant Examiner* — Kalpana Bharadwaj

(57) ABSTRACT

A process for evaluating and geocoding of GIS data elements utilizes a plurality of "locate" tests and a weighting scheme to express the match results as a multidimensional vector. Multiple inputs and data sources, as well as ambiguous and partial input data, are used to generate an output with improved precision by applying a weighting function to each input element and generating a set of test vectors (i.e., in the input data element weighted by the known accuracy of the element/ source). A sum of a plurality of tests is then generated as the "characteristic vector" of the test set. By using two (or more) different sets of tests, two (or more) characteristic vectors are formed. Various well-known algebraic techniques can then be used to evaluate the results of each set of tests and select the "best match" result.

5 Claims, 4 Drawing Sheets

| STREET | FROM LEFT | TO LEFT | FROM RIGHT | TO RIGHT |
|---|---|---|---|---|
| ELM ST. | 100 | 198 | 101 | 199 |

FIG. 1

| STREET | FROM LEFT | TO LEFT | FROM RIGHT | TO RIGHT |
|---|---|---|---|---|
| ELM ST. | 100 | 198 | 101 | 199 |

FIG. 2

| REC # | GEOCODE TYPE | FULL ADDRESS | CITY | ZIP | ZIP + 4 | LONGITUDE | LATITUDE |
|---|---|---|---|---|---|---|---|
| 1 | STREET LEVEL | 000063 MCKOWN RD | ALBANY NY | 12203 | 3431 | −73.8408 | 42.6746 |
| 2 | ZIP+4 CENTROID | 000112 MCKOWN RD W | ALBANY NY | 12203 | 5925 | −73.844 | 42.6748 |
| 3 | ZIP+2 CENTROID | 000218 FERNDALE ST N | SAINT PAUL MN | 55119 | 4711 | −92.9907 | 44.9444 |
| 4 | 5 DIGIT ZIP CENTROID | 000140 115th ST | AUBURN WA | 98002 | 0000 | −112.2134 | 47.3089 |
| 5 | 5 DIGIT ZIP CENTROID | 000000 PO BOX 1423 | CLIFTON PARK NY | 12065 | 0806 | −73.7889 | 42.847 |
| 6 | 5 DIGIT ZIP CENTROID | 000078 CHERRY AVE RD | DELMAR NY | 12054 | 0000 | −74.1909 | 42.7544 |
| 7 | UNGEO-CODED | 5593 BRIDLE CT | | 00000 | 0000 | 0 | 0 |
| 8 | UNGEO-CODED | SAN BERN-ADINO AVE | ONTARIO CA | 00000 | 0000 | 0 | 0 |
| 9 | UNGEO-CODED | 225 SCOTT ST | RIALTO CA | 92376 | 0000 | 0 | 0 |
| 10 | UNGEO-CODED | 000000 | EAST BERNE NY | 00000 | 0000 | 0 | 0 | ns # GEOCODING METHOD USING MULTIDIMENSIONAL VECTOR SPACES

CROSS-REFERENCE TO RELATED APPLICATIONS

The present application is a continuation of U.S. Ser. No. 11/319,112, filed Dec. 27, 2005, now abandoned which claims the benefit of U.S. Provisional Application No. 60/649,286, filed Feb. 2, 2005.

TECHNICAL FIELD

The present invention relates to a process for the evaluation and geocoding of geographic information systems (GIS) data elements and, more particularly, to a process that uses multiple "locate" tests and a weighting scheme to express the search results as a multidimensional vector.

BACKGROUND OF THE INVENTION

Geocoding is generally thought of as the act, method, or process of programmatically assigning x and y coordinates (usually, but not limited to, latitude and longitude) to records, lists and files containing location information (full addresses, partial addresses, zip codes, census FIPS codes, etc.) for cartographic or any other form of spatial analysis or reference. Currently, geocoding is used to convert a street address or other textually-specific geographic location information into a physical location. Geocoding is currently performed by running ungeocoded information ("raw data") through proprietary software that performs table lookup, fuzzy logic and address matching against an entire "library" of all known or available addresses (referred to hereinafter as "georeferenced library") with associated x,y locating coordinates. The raw data that match the records from the georeferenced library are then assigned the same x,y coordinates associated with the matched record in the georeferenced library. A "centroid" is defined as a geographic center of an entire area, region, boundary, etc. for which the specific geographic area covers. Street vectors are defined as address ranges that are assigned to segments of individual streets. Street vectors are used in displays of digitized computer-based street maps, and usually appear as left-side and right-side address ranges. They are also used for geocoding a particular address to a particular street segment based on its point along the line segment. FIG. 1 contains a table showing the address range on both sides of the street for one particular street segment of Elm St.

Geographic information systems (GIS) store, retrieve and display topological information. The topological information is obtained from a topology that is a topographic study of a geographic region. The topographic study may be a map having features of the geographic region including rivers, lakes, etc, as well as bridges and roads.

A geo-referenced library can be compiled from a number of various sources, including US Census address information and US Postal address information, as well as ZIP Code boundaries and other various sources of data containing geographic information and/or location geometry. In the prior art, if a raw data address could be matched exactly to a specific library street address, then an attempt was made to match the raw data address to an ever-decreasing precision geographic hierarchy of point, line or region geography until a predetermined tolerance for an acceptable match was met. Current geocoding technology generally provides for two main types of precision: street level and postal ZIP centroid. Street level precision is the placement of geocoded records at the street address (as shown in record 10 of FIG. 2). Street level precision attempts to geocode all records to the actual street address. In all likelihood, some matches may end up at a less precise location, such as a ZIP centroid (e.g., ZIP+4, ZIP+2, or ZIP). One of the disadvantages of ZIP code matching alone is that current geocoding technology only examines the ZIP code field when matching. If the ZIP codes in the raw data records do not already have ZIP+4 values, then current geocoding technology will only match to the larger area 5-digit ZIP code centroids. Conversely, if only the street level precision is used, current geocoding technology will attempt to return street-level coordinates and will optionally fall back to the slightly less precise ZIP+4 coordinates.

The typical output from a geocoding process (a "match") is a longitude/latitude coordinate pair specifying a point on the earth's surface. Current geocoding technology is considered to be imprecise, and only works well when the input is a well-formed and existing street address and the desired output is a physical point location. Sub-optimal performance has been the result when one or more of the following elements is involved in the geocoding process: (1) the input element is an incomplete street address; (2) the input postal address is valid, but has a large interpolation error, or is located via a zip code centroid or other imprecise method; (3) the address is ambiguous (i.e., multiple "hits" are returned for the input address); (4) the input element is not a point location, but a set of locations or polygon; (5) the geocoding system has multiple data sets for a single locator type; or (6) the desired result is not a point longitude/latitude location, but a bounding geometry (minimal bounding rectangle—MBR) in which the input element must definitely lie.

Thus, a need remains in the geocoding art for a method that is able to return a more precise result from any of a variety of incomplete input data.

SUMMARY OF THE INVENTION

The need remaining in the prior art is addressed by the present invention, which relates to a process for evaluation and geocoding of GIS data elements and, more particularly, to a process that uses a plurality of "locate" tests and a weighting scheme to express the match results as a multidimensional vector.

In accordance with the present invention, multiple inputs and data sources, as well as ambiguous and partial input data, is used to generate an output with improved precision by applying a weighting function to each input element and generating a set of test vectors (i.e., the input data element weighted by the known accuracy of the element/source). A sum of a plurality of tests is then generated as the "characteristic vector" of the test set. By using two (or more) different sets of tests, two (or more) characteristic vectors are formed. Various well-known algebraic techniques can then be used to evaluate the results of each set of tests and select the "best match" result.

For example, the length of a characteristic vector can be calculated and used to determine the likelihood of a "match" between the test results and the input data. A comparison of the lengths of multiple characteristic vectors is used to determine the "best match" between the input address information and the output longitude/latitude result. A correlation between the tests used in each test set can be determined by analyzing the angle between two characteristic vectors (e.g., an angle of 90°—orthogonal vectors—defining each test set as completely independent, and an angle of 0°—parallel vectors—defining each test set as containing the same individual tests). To establish how closely two match results agree with each other, a vector subtraction is performed between the two characteristic vectors. The value of each component gives the difference for each test, and the norm of the result yields the overall difference in confidence level.

Other and further aspects of the present invention will become apparent during the course of the following discussion and by reference to the accompanying drawings.

BRIEF DESCRIPTION OF THE DRAWINGS

Referring now to the drawings,

FIG. 1 is a diagram of a street level data along an address range for an exemplary street segment;

FIG. 2 contains a table showing examples of prior art geocoded records with data fields including centroids of different precision;

DETAILED DESCRIPTION

Figure 3:
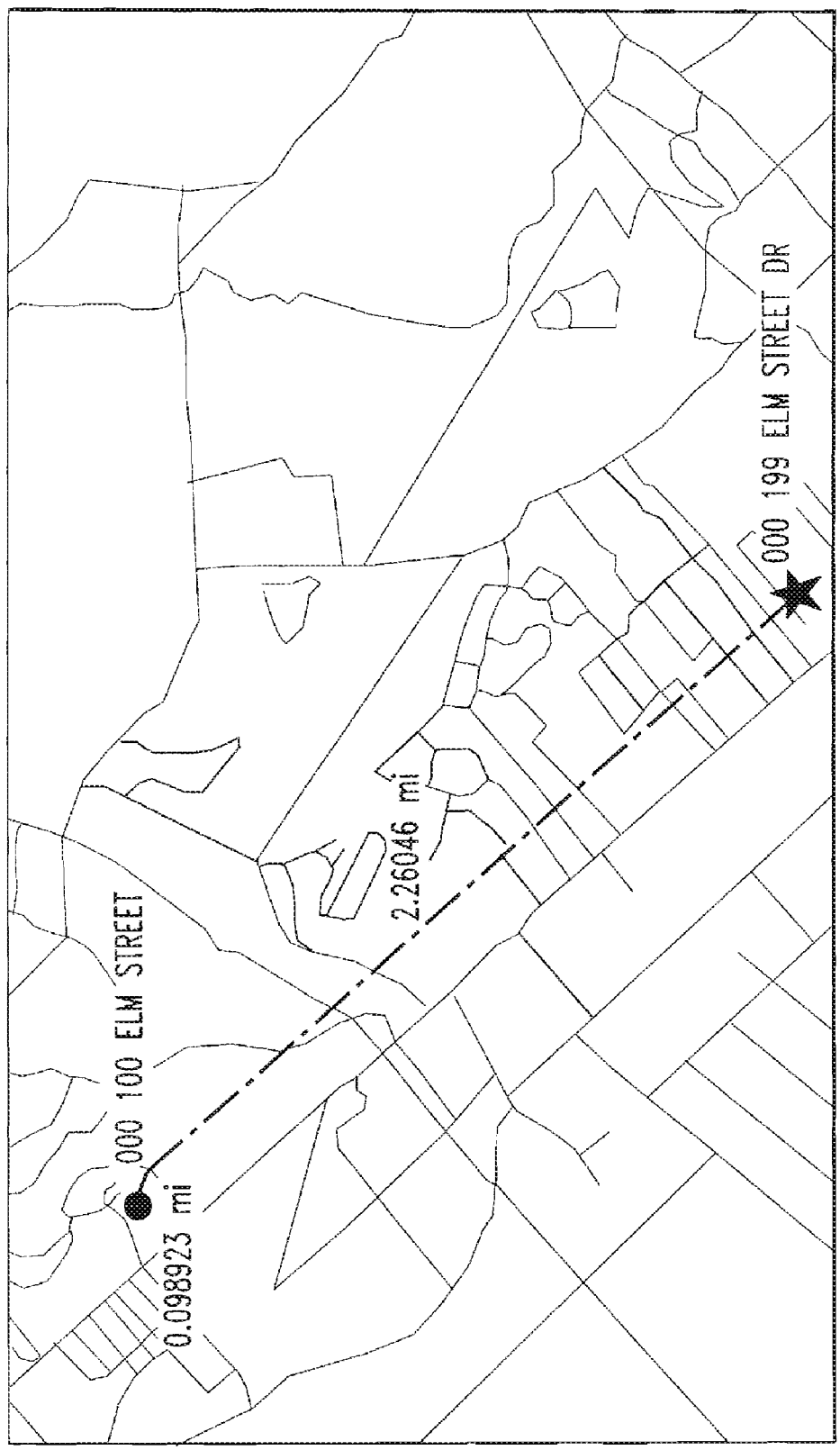
FIG. 3 illustrates the application of an address block range to a particular address.

A vector is defined as a geometric element possessing both length and direction. A "characteristic vector", for the purposes of the present invention, is defined as a "locate" match result that is a measure of both the reliability of the match and the tests used to find the match. The characteristic vector, by itself, does not indicate anything about the actual physical location of a match.

Simple geocoding involves a single test (or set of dependent tests) that is used to generate a single result (the most likely match). In accordance with the teachings of the present invention, multiple tests and multiple data inputs are used to generate a plurality of characteristic vectors, where vector mathematical properties are then exploited to convert imprecise point location results into precise bounding geometries.

Consider a set of tests $t_0, t_1, \ldots, t_n$ and their associated results for a specific point, expressed as "uncertainty" factors $u_0, u_1, \ldots, u_n$. Various tests for geocoding include, but are not limited to: (1) street address; (2) cross-street location; and (3) gridname. If a weight $w_i$ is assigned to each test, the overall certainty of a selected group of tests can be expressed as a characteristic vector in the following form:

$$w_0(1-u_0)+w_1(1-u_1)+\ldots+w_n(1-u_n).$$

As will be discussed below, a "weighting constant" w is used to adjust the percentage of each test result used in calculating the characteristic vector. A second set of tests can be used to perform the same "locate" process, generating a second characteristic vector. As stated above, this process can be considered as a sum of vectors in an n-dimensional vector space, which allows for the use of tools and theorems from vector algebra in generating the solution set for geocoding. The sum is the characteristic vector for the specific test manifold, where its resultant geometry (either a point object or a bounding polygon) is denoted as $\Gamma$, or $\Gamma(r)$ for a single result candidate r. With proper manipulation of the weighting constants, a single test with multiple data sources can also be expressed as multiple tests, appended to the characteristic vector.

The likelihood of a single match being the actual location of an object is, in geometric terms, the length of the characteristic vector x. Mathematically, it can be expressed as the norm of x:

$$|x|=(x_1^2+x_2^2+x_3^2+\ldots)^{1/2}.$$

For example, consider a match agreed upon by a street address test with a certainty of 0.8, a cross street test with a certainty of 0.3, and a grid test with a certainty of 0.6. The overall certainty of this match is then the square root of $(0.8)^2+(0.3)^2+(0.6)^2$, or 0.94. This is a generalized value appropriate for all calculations and comparisons. To display this result as percentage, by dividing the length of the unit vector (in this case, the length is equal to 3), for a result of 54%. The most probable match among a match result set is simply the longest characteristic vector, or mathematically the maximum of the norm of the vector set, expressed as:

$$\max|x_j|, j=1, 2, \ldots, n.$$

The result of geocoding an object will often include more than one potential location. For example, a locate on "123 Elm Street, Anytown, USA, inswide grid 3722A7730C" could result in a match on South Elm Street, a second match on North Elm Street, and a third match based on the grid name. Any of these three may be the actual location, or all three could be incorrect. The certainty of the result set (e.g., the probability that one of the three is correct), is the norm of the vector sum of the set. Defined geometrically, the certainty is defined as the length of the line made by connecting each of the vectors end-to-end. Mathematically, this can be expressed as:

$$|(x_1+x_2+x_3+\ldots)|.$$

To establish how closely two match results agree with each other, a vector subtraction is performed. The value of each component gives the difference for each corresponding test, and the norm of the result gives the overall difference in confidence level. A vector operation can also be used to determine how closely two different result sets agree, by first summing the characteristic vectors of each set, then performing a vector subtraction of one sum from the other.

Often, in comparing two match results, the actual confidence of the match is irrelevant, since the requester simply wants to know if the matches used any or all of the same tests. The angle between the two vectors yields this information, with an angle of 90° associated with the use of completely independent tests (i.e., no tests used for match 1 were used in match 2), and an angle of 0° associated with identical tests being used for both match 1 and match 2. Any angle between these two values gives a measure of the variance in the composition of the tests used to develop the two matches.

If a series of locate tests is performed on an object, it is usually assumed that those tests are independent, that is, their results and degrees of certainty are arrived at by different means and do not depend on each other. In mathematical terms, the assumption is that the characteristic vector is an "orthonormal" basis, implying that the individual elements in the characteristic vector are orthogonal (perpendicular) to each other. If two tests are not independent, the result may be skewed. This skewed dependency can be corrected by first converting the vectors to an orthonormal basis, or by summing and normalizing the dependent tests, then adding the resultant single vector to the characteristic vector.

For example, a "locate" based on both a street address test and a grid test (match 1), versus a "locate" based on two slightly different grid tests (match 2) may yield different results. Logic would imply that the latter "locate" process would be more reliable than one performed simply upon a single grid test (i.e., a one-dimensional search), but less reliable than the first "locate" based on two independent tests. To compensate for this dependence, the test results for the dependent vectors may first be added together, then normalized. Generalizing for a set of n dependent tests, the process is:

$$(d_1+d_2+\ldots+d_n)/n.$$

This is the preferred method, in accordance with the present invention, for handling a set of mutually dependent tests.

Any single test will typically return an exact point location or a small region, indicating the approximate location of an object. Bounding objects are test results expressed as the smallest region in which the object must lie; such objects therefore convey both the location of the object as well as the degree of uncertainty in the location of the object. Error weights are often used with the bounding process, where in particular error weights are used in two ways. First, the error weights are used to adjust the uncertainty of a particular test, such as to decrease (or eliminate altogether) its contribution to the overall certainty and selection of a match. Second, the error weights can be used to modify the size of a bounding object for a given test.

In the first case, consider street address data that is reported from three different vendors. The first vendor is known to always accurately report street address data. The second vendor is known to often give incorrect values, and the third vendor fails to report data altogether. The street address test might the use an error weight array of (1.0, 0.5, 0.0) for this example, giving data from the first vendor 100% confidence weight, only 50% for the second vendor (making the results from the first vendor more dominant), and ignore the data reported by the third vendor. An example of the second defined use of error weights would be an array of values for each state in the United States. A state with 100% accurate grid data would receive a weight of 0.0, meaning the bounding object for a grid cell would be drawn exactly the same size as the grid, where a state with known positioning error in grids might have a weight of 0.25, to force the bounding object to be drawn 25% larger than the grid it encloses.

A weighting function is used instead of a weighting matrix when the uncertainty is expressible as a function of test types, test parameters, position and other factors. One exemplary function relates to returning the maximum interpolation error for a given street address block. For an address of, for example, "123 Elm", a street address database does not store the actual latitude and longitude values. Instead, it stores the endpoints of an address block range (ABR) from 100-199 Elm, as shown in FIG. 3, and the uses the actual address as an offset:

Location ("123 Elm")–Location (""100 Elm")+123/199

[Location("199 Elm")]

Interpolation relies on the assumption that all addresses are distributed evenly along a street. To create a bounding area for a street address "locate" request, the point returned from this interpolation must be expanded by the maximum error possible for that address block.

In most situations, it is not necessary to require the exact address of an object as much as to determine if the object lies within a given area. Examples of this include queries such as "all homes more than 5 miles from a police station", or "does this location lie within a cable right-of-way". In these cases, treating multiple match locations separately is not appropriate. Instead, it is preferable to combine all matches into one larger entity that must contain the search object, where this is defined as the "apposite bounding surface". An apposite bounding surface is calculated in one of three ways: minimum bounding rectangle (MBR), convex hull, or poly-polygon. The MBR is defined as the smallest rectangle which fully encloses all of the bounding objects, the corners of which are quickly calculated by taking the "min" and "max" of the latitude and longitude values of each bounding object in the result set:

$$MBR(x_1, y_1, x_2, y_2) = (\min|x|, \min|y|, \max|x|, \max|y|).$$

The convex hull is calculable by any well-known algorithm, and the bounding poly-polygon is formed simply by concatenating each of the individual bounding polygons into single multipart object. An MBR is generally less accurate and is typically used to increase performance for smaller geometries. It may also be used for orthogonally aligned data (such as grids or street blocks) in which case its accuracy may actually be superior.

The size of a bounding geometry test is both test-specific and application-specific. For a street address test, it is generally computed based on the interpolation interval of the underlying street address block, that is, the mean (or max) error in calculating a specific address from the location of an address block endpoint. For addresses located via a zip code centroid, the geometry is sized to the defining polygon of the zip code, or an MBR for the zip code. For tests such as nearest street/intersection, the geometry is sized as a linear function of the local object density.

Figure 4:
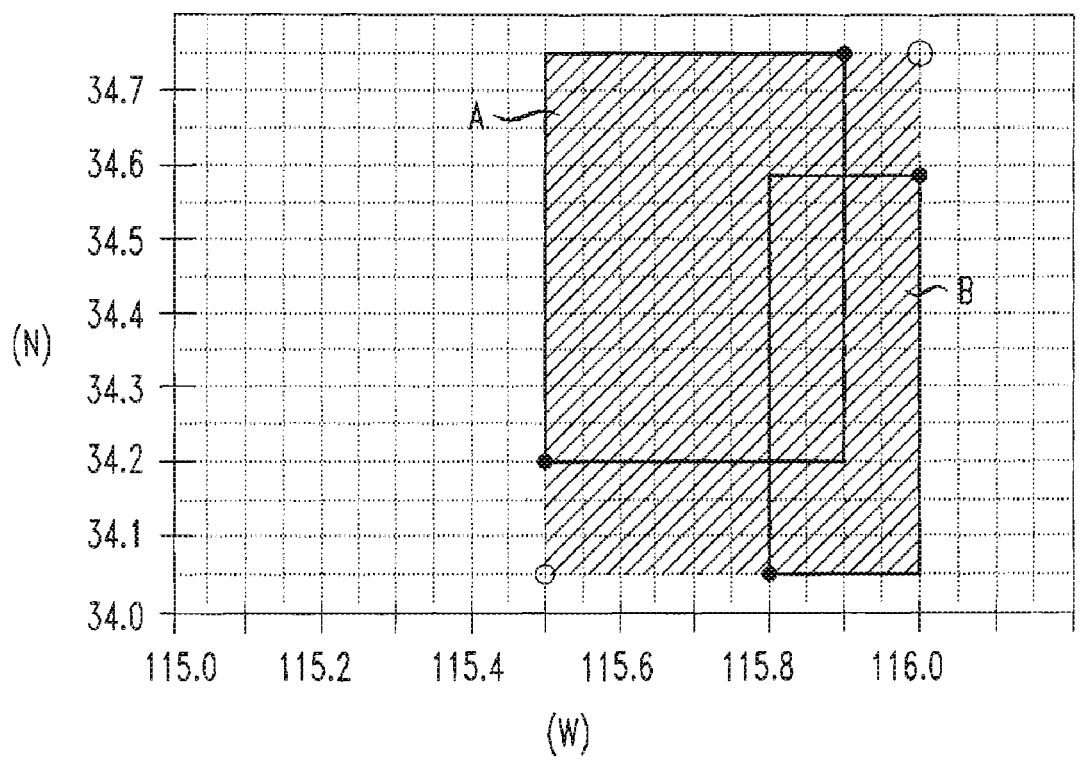
FIG. 4 illustrates the utilization of longitude and latitude information to form a minimum boundary rectangle.

For example, a geocoding search results in two possible locations for an object, as shown in FIG. 4. The latitude-longitude values for the first location's bounding rectangle (denoted as rectangle A in FIG. 4) are 34.2 North, 115.50 West, to 34.75 North, 115.90 West. The second bounding rectangle (rectangle B) is from 34.05 North, 115.80 West to 34.59 North, 116.00 West. Calculating the MBR results in: 34.05 North, 115.50 West to 34.75 North, 116.00 West, where this is then defined as the apposite bound for the object, and is indicated as the shaded region in FIG. 4. Once the apposite bound for the object is created, a query such as "is this object located within 100 feet of a cable that runs from 115.00 West, 33.5 North to 116.5 West, 33.60 North" (shown as query Q on FIG. 4) can be answered. Since the MBR in this example is at all points more than 100 feet from the cable, the query can be answered in the negative without needing to know the true location of the object.

Figure 5:
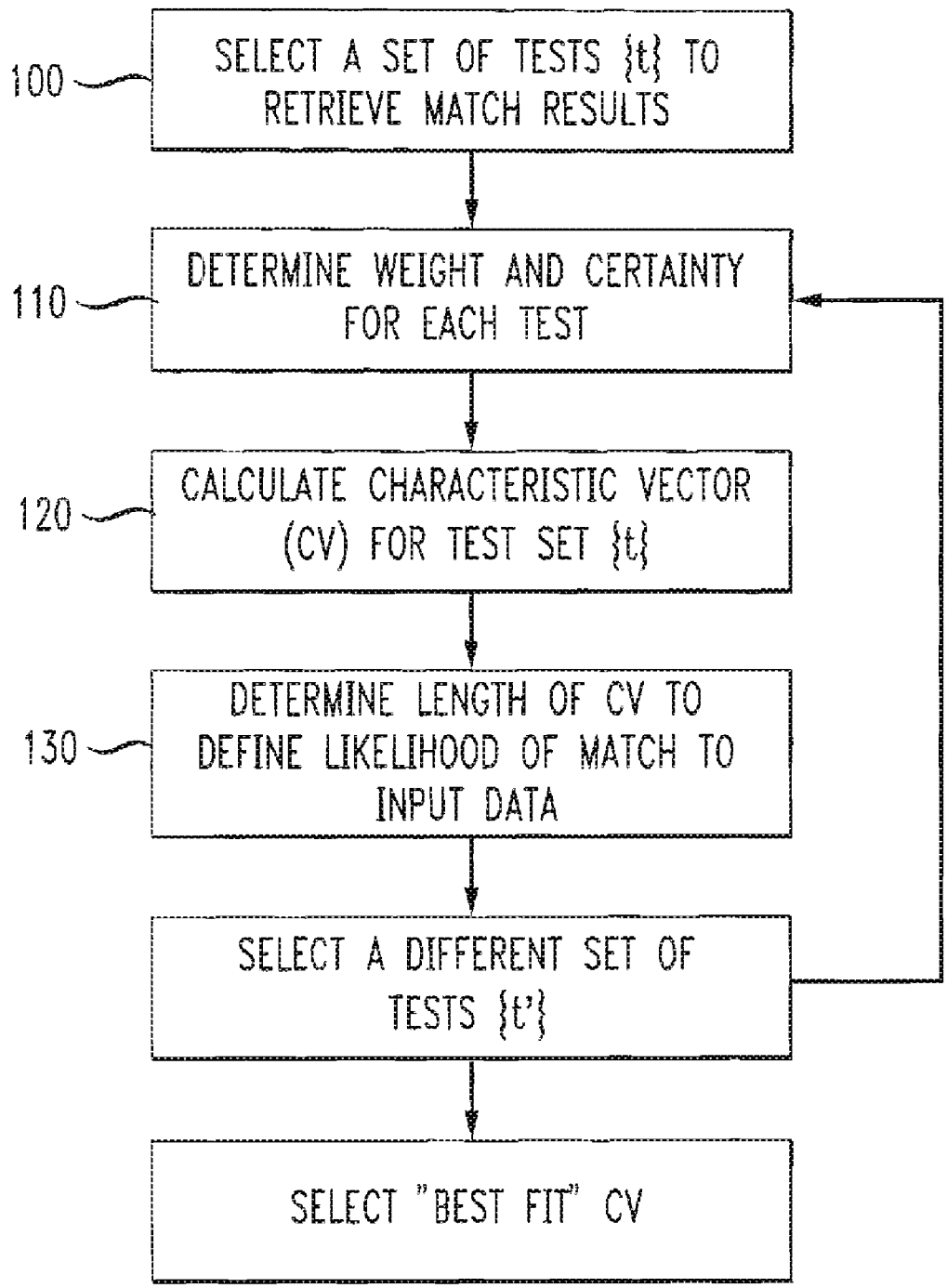
FIG. 5 is a flowchart illustrating an exemplary process of utilizing multiple tests to form characteristic vectors in accordance with the present invention.

In summary, the flowchart of FIG. 5 illustrates the basic processes of the present invention used to convert input data (which may be incomplete, ambiguous, etc.) into a relatively precise "locate" match result. As shown, the process begins at step 100 by selecting a subset of tests to be used to retrieve "locate" information for the input data, where the particular subset chosen may depend upon the type of input data (e.g., street address vs. ZIP code vs. gridname), as well as the desired result (e.g., point location vs. boundary). Once a first set of tests has been selected, the input data is applied to the tests to generate the output, where for each test a "certainty factor" (1−u) and weighting function (w) is determined (step 110). A characteristic vector is then generated (step 120) by summing each test element component's certainty factor multiplied by its weighting constant. Once a characteristics vector is formed, algebraic techniques are used to assess the likelihood that the vector matches the input data. If steps 100-120 are repeated with a different test set (where one or more of the individual tests are different) another characteristic vector is generated, and vector concepts can then be used to assess the differences between the two characteristic vectors and define the vector that is the best match to the input data.

While the present invention has been described with reference to one or more particular embodiments, it is to be understood that those skilled in the art will recognize that many changes may be made thereto without departing from the spirit and scope of the present invention. The following claims set forth the scope of the present invention.

What is claimed is:

1. A computerized method of evaluating a reliability of using ambiguous input geographic data to generate a geocoded bounding object, the method comprising:

selecting a first plurality of n different types of locate test to be used to convert the ambiguous input geographic data into a bounded object output having latitude and longitude information;

retrieving a known certainty value (1−u) associated with each test in the selected first plurality of n different types of locate tests, wherein each test comprises a unique uncertainty value u;

defining a weighting constant (w) for each test in said selected first plurality of n different types of locate tests, the weighting constant within a range of 0.0 to 1.0; and generating an apposite bounding surface defining the reliability of the bounded object output with respect to the ambiguous input geographic data, the apposite bounding surface defined as the combination of all matches from the plurality of n different types of locate tests.

2. The method as defined in claim 1 wherein the apposite bounding surface is calculated as a minimum bounding rectangle.

3. The method as defined in claim 2 wherein the minimum bounding rectangle is defined as the smallest rectangle which fully encloses all of the matches, the corners of which are calculated by taking the min and max of latitude and longitude values associated with each test.

4. The method as defined in claim 1 wherein the apposite bounding surface is defined as a convex hull.

5. The method as defined in claim 1 wherein the apposite bounding surface is defined as a poly-polygon.

* * * * *